Patented Sept. 3, 1935

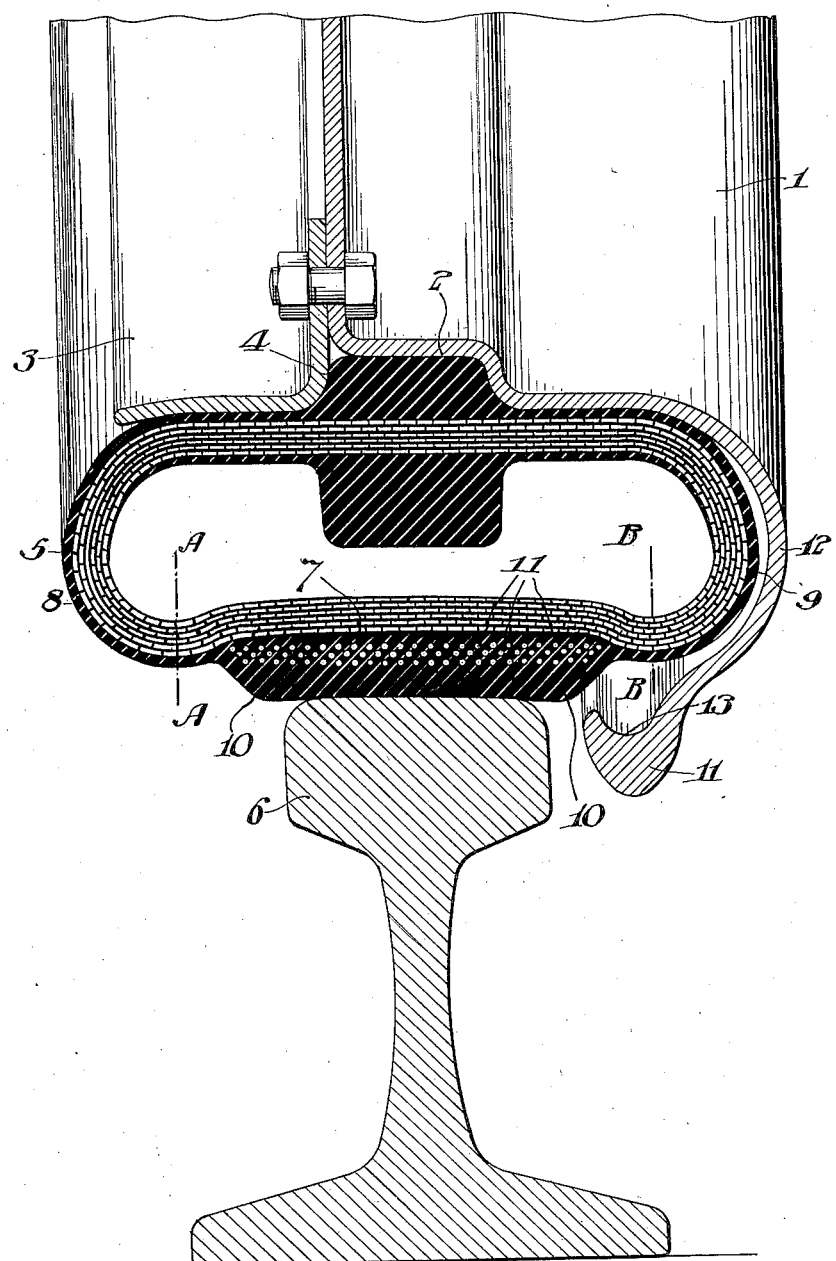

2,013,130

UNITED STATES PATENT OFFICE 2,013,130

PNEUMATIC TIRE

Edward G. Budd, Philadelphia, Pa., assignor to Edward G. Budd Manufacturing Company, Philadelphia, Pa., a corporation of Pennsylvania Application July 12, 1932, Serial No. 622,027

4 Claims. (Cl. 295—31)

The present invention relates to pneumatic tires and particularly to a tire of this type for rail cars.

In the use of pneumatic tires on rail cars, the actual width of tread is limited to the width of the rail head which in turn limits the load which can be carried by the tire. If the tire is given a width greater than the rail and is loaded so as to overhang the sides of the rail head, the effective width of the tread will be increased, but with the disadvantage that the sides of the tire will drop considerably below the level of the rail head on each side resulting in extreme bending of those portions of the tire walls which drop below the top of the rail head. Such extreme bending would bring about fatigue and breakage of the regions subjected to it. There would also be danger of the downwardly overhanging portions interfering with switch points in the tracks, or becoming wedged between the rail side and the wheel flange.

The main object of the present invention is to increase the effective tread with consequent increase in load carrying capacity for a given pressure and given width of rail head, without incurring the above noted disadvantages. This object is achieved by the provision of a tire so proportioned and arranged in relation to the flange and the width of the rail head, that a substantial portion of the sides of the tire overhang the rail head, and the provision of a thickened relatively stiff tread portion on the tire arranged to engage the rail head and provided with lateral extensions engaging the overhanging sides of the tire to prevent undue bending thereof and maintain the sides above the rail head.

A preferred embodiment of the invention is illustrated in the accompanying drawing which shows in transverse section, the wheel, tire and rail head in their co-operative relation, with the tire inflated and under normal load.

Referring to the drawing in detail, the wheel rim 1 is provided with a tire retaining channel 2 arranged to be opened at one side by the provision of a removable rim portion 3. This channel receives the retaining rib 4 of the tire 5 through which the wheel rests on the rail head 6. The outer or tread wall of the tire is provided with a thickened relatively stiff tread portion 7 of a width greater than the width of the rail head. To increase the effective width of the tread beyond that of the actual tread as constituted by the rail engaging portion of the under side of tread portion 7, the body portion of the tire is so shaped and proportioned with relation to the inflation pressure and load that when under normal load and pressure the side portions 8 and 9 will extend a substantial distance laterally of the rail head and even beyond the sides of the tread portion 7, as shown in the drawing, the side portions tending to overhang but being prevented by the stiffened tread from dropping appreciably below the level of the tread portion. To limit the amount of this drop and consequently the amount of bending of the tire walls at the overhang, the edge portions 10 of the thickened relatively stiff tread portion 7 overlying the sides of the rail head are extended upwardly and outwardly into engagement with the extended sides of the tire at points laterally spaced from the sides of the rail head. The tread portion 7 including its extended edge portions 10, is made relatively stiff by circumferential reinforcing wire cables 11 and suitable transverse or crosswise wires, not shown, the reinforcement being carried out to a degree to give the tread portion 7 sufficient stiffness to prevent its bending down over the sides of the rail head while retaining sufficient flexibility to take care of inequalities in rail surface and permit flexing of the tire as a whole.

The outwardly extended edge portions 10 thus bolster up the side portions 8 and 9 to limit the downward bending and distribute the counter load from the rail head over a portion of the tire wall of substantially greater width than the rail head. The effective width of the tire tread is substantially equal to the distance between lines A—A and B—B. This increase in effective tread area increases the load capacity of the tire for a given inflation pressure and area of actual tread or rail-contact area.

The tire and its parts are so proportioned and related to a guide flange 11 carried by the wheel rim 1 as to maintain the tire elements properly centered with respect to the rail head, the flange 11 being laterally offset at 12 to prevent frictional contact between the tire and flange. The thickened rim 13 of the flange 11 has its lower face of downwardly convex form to facilitate entrance between switch points and rails for the easy operation of the former.

While I have thus shown and described a preferred embodiment of my invention for the sake of disclosure, it is to be understood that the invention is not limited to such specific embodiment, but contemplates all such modifications and variants as fall fairly within the scope of the appended claims.

What I claim is:

1. In combination, in a heavy duty rail car wheel, a pneumatic tire including a thick flat tread conforming to the rail and projecting upwardly and laterally at its sides, the hollow body on the tread being of flat side ellipsoidal shape having its major axis across the rail direction and considerably wider than the tread whereby the tire body forms lobes adjacent to the ends of said axis dipping downwardly beside the tread, and a wheel body including an annular front opening channel portion embracing the rear of said lobes and having a rail side flange radially opposite the rear lobe, and means in the tire limiting drop of the radially-inner tire wall and consequently the drop of the lobes and the flange by a safe distance relative to rail parts.

2. A pneumatic rail car tire having a thickened tread portion for engaging a rail head of substantially greater width than the width of a standard rail head, and relatively thin flexible side walls extending substantial distances laterally of the thickened tread portion and adapted to bend under load extensively downwardly toward the plane of the rail engaging face of the tread portion, said tread portion being stiffened laterally to prevent downward bending of its lateral portions overhanging the rail head to any substantial extent, the downward bending of the thin side walls acting to measurably suspend them from the stiffened tread portion and prevent them from reaching the plane of the rail engaging face of the tread, the thickness of which exceeds the maximum downward bending of the flexible side walls.

3. A pneumatic rail car tire comprising a body portion of flat oval cross section when inflated and under load, said body portion having a thickened and stiffened tread portion for engaging the rail head of a width substantially greater than the width of a standard rail head, and relatively thin flexible side walls extending substantial distances laterally of the thickened tread portion and adapted to bend under load extensively downwardly toward the plane of the rail engaging face of the tread portion, the stiffened lateral rail overhanging portions of the tread preventing downward bending of the tread portion to any substantial extent, the downward bending of the thin side walls acting to measurably suspend them from the stiffened tread portion and prevent them from reaching the plane of the rail engaging face of the tread, the thickness of which exceeds the maximum downward bending of the flexible side walls.

4. A pneumatic rail car tire having a continuous closed body wall, said body wall having a thickened tread portion for engaging the rail head of substantially greater width than the width of a standard rail head, and relatively thin flexible side walls extending laterally substantial distances beyond the thickened tread portion and adapted to bend under load downwardly toward the plane of the rail engaging face of the tread portion in lobed formation, the stiffened lateral rail overhanging portions of the tread preventing downward bending of the tread portion to any substantial extent, the downward bending of the thin side walls acting to measurably suspend them from the stiffened tread portion and prevent them from reaching the plane of the rail engaging face of the tread, the thickness of which exceeds the maximum downward bending of the flexible side walls.

EDWARD G. BUDD.